United States Patent
Edge

(10) Patent No.: US 7,209,147 B2
(45) Date of Patent: Apr. 24, 2007

(54) CORRECTION TECHNIQUES FOR SOFT PROOFING

(75) Inventor: Christopher J. Edge, Saint Paul, MN (US)

(73) Assignee: Kodak Polychrome Graphics Co. Ltd., Norwalk, CT (US)

( * ) Notice: Subject to any disclaimer, the term of this patent is extended or adjusted under 35 U.S.C. 154(b) by 134 days.

(21) Appl. No.: 09/808,875

(22) Filed: Mar. 15, 2001

(65) Prior Publication Data

US 2002/0167528 A1 Nov. 14, 2002

(51) Int. Cl.
*G09G 5/02* (2006.01)
*G09G 5/00* (2006.01)

(52) U.S. Cl. .................. 345/603; 345/581; 345/589

(58) Field of Classification Search ............. 345/603, 345/604, 589, 581, 426, 590, 591; 358/523, 358/1.9, 518, 516, 520; 382/167, 162
See application file for complete search history.

(56) References Cited

U.S. PATENT DOCUMENTS

| | | | |
|---|---|---|---|
| 4,926,254 A | 5/1990 | Nakatsuka et al. | |
| 4,958,220 A | 9/1990 | Alessi et al. | |
| 5,027,196 A | 6/1991 | Ono et al. | |
| 5,371,537 A | 12/1994 | Bohan et al. | |
| 5,381,349 A | 1/1995 | Winter et al. | |
| 5,512,961 A | 4/1996 | Cappels, Sr. | |
| 5,638,117 A | 6/1997 | Engeldrum et al. | |
| 5,739,809 A | 4/1998 | McLaughlin et al. | |
| 5,754,682 A * | 5/1998 | Katoh | 382/167 |
| 5,781,206 A | 7/1998 | Edge | |
| 5,877,787 A | 3/1999 | Edge | |
| 5,907,667 A | 5/1999 | Shiraishi | |
| 6,008,836 A | 12/1999 | Bruck et al. | |
| 6,027,201 A | 2/2000 | Edge | |
| 6,043,909 A | 3/2000 | Holub | |
| 6,091,518 A | 7/2000 | Anabuki | |
| 6,229,916 B1 * | 5/2001 | Ohkubo | 358/520 |

(Continued)

FOREIGN PATENT DOCUMENTS

JP 10-224643 8/1998

(Continued)

OTHER PUBLICATIONS

Braun et al., "Physchophysical Generation of Matching Images for Cross-Media Color Reproduction," Final Program and Proceedings of IS&T/SID Fourth Color Imaging Conference: Color Science, Systems and Applications, Proceedings of the Fourth Color Imaging Conference: Color Science, Systems and Applications, Scottsdale, AZ, pp. 214-220, Nov. 19-22, 1996.

(Continued)

*Primary Examiner*—Kee M. Tung
*Assistant Examiner*—Chante Harrison
(74) *Attorney, Agent, or Firm*—Shumakel & Steffert, P.A.

(57) ABSTRACT

In one embodiment a method includes obtaining a white point correction for a display device and obtaining a chromatic correction for the display device. The method may also include generating corrected color coordinates based on the white point and chromatic corrections. The method may ensure that images that appear on a display device in a soft proofing environment will be visually equivalent to images that appear on print media.

19 Claims, 5 Drawing Sheets

U.S. PATENT DOCUMENTS

| | | | |
|---|---|---|---|
| 6,340,975 B2 * | 1/2002 | Marsden et al. | 345/590 |
| 6,480,202 B1 * | 11/2002 | Deguchi et al. | 345/600 |
| 6,522,313 B1 * | 2/2003 | Cottone | 345/589 X |
| 2005/0220340 A1 * | 10/2005 | Nakabayashi et al. | 382/167 |

FOREIGN PATENT DOCUMENTS

| | | |
|---|---|---|
| JP | 11232073 | 8/1999 |
| WO | WO 98/15091 | 4/1998 |
| WO | WO 00/29935 | 5/2000 |
| WO | WO 2000JP00174 | 7/2000 |

OTHER PUBLICATIONS

"Adobe Photoshop 5.0 User Guide," Adobe Systems Incorporated, pp. 82-84, 1998.

Fox et al., *Computer Networks and ISDN Systems*, 1996, 28(7-11):1445-1456.

Praxisoft Brochure, entitled "Introducing REALNETCOLOR™," no date available.

Praxisoft: Color Matching Solutions—Internet Solutions—REALNETCOLOR™, no date available.

Press Release—True Internet Color Patent Filings—in True Internet Color(r), E-Color, Incorporated, Apr. 2000.

Mark D. Fairchild, Color Appearance Models, pp. 188-189, Addison-Wesley 1998.

Adobe Gamma Display Calibrator, Version 3.0, 1998.

E-Color, Inc. Brochure, "True Internet Color Assures Online Color Accuracy For e-Commerce Applications," 10 pgs., no date available.

* cited by examiner

CORRECTION TECHNIQUES FOR SOFT PROOFING

FIELD

The invention relates to color imaging and, more particularly, to techniques for presentation of color images on display devices.

BACKGROUND

Color imaging devices use combinations of different device-dependent coordinates to form color images for display or printout on media such as paper or film. Many hardcopy printing devices use combinations of cyan, magenta, yellow, and black (CMYK) to form color imagery. These device-dependent coordinates of C, M, Y and K may be combined to form a gamut of calorimetric values that the device is capable of producing. Display devices, such as cathode ray tubes (CRTs) or flat panel monitors, may use the device-dependent coordinates of red, green, and blue (RGB). Some high-fidelity color imaging devices may use the device-dependent coordinates cyan, magenta, yellow, and black in combination with other coordinates such as orange and green. These and other device-dependent coordinate systems have been developed for use with various color imaging devices.

Many different device-independent coordinate systems have been developed in an attempt to standardize color specification across different devices. For instance, the Commission Internationale de l'Eclairage (CIE) has developed device-independent color spaces such as the L*a*b* color space (hereafter L*a*b* color space, L*a*b* space, or simply L*a*b*) and the XYZ color space (hereafter XYZ color space, XYZ space, or simply XYZ). Moreover, several other organizations and individuals have developed other device-independent color spaces.

A point in a device-independent color space theoretically defines a color value irrespective of any particular device coordinates. A point in L*a*b* space or XYZ space, for instance, can be mapped to a point in a device gamut. That point in the device gamut, in turn, defines the device-dependent coordinates that will theoretically cause the device to produce a color that is visually equivalent to that defined by the point in L*a*b* space or XYZ space.

The term "soft proofing" refers to a proofing process that makes use of a display device rather than a printed hard copy. Traditionally, color proofing techniques have relied on "hard copy proofing," where proofs are printed out on paper or other print media and inspected to ensure that the images and colors look visually correct. For instance, color characteristics can be adjusted and successive hard copy prints can be examined in the hard copy proofing process. After determining that a particular proof is acceptable, the color characteristics used to make the acceptable proof can be reused to mass-produce, e.g., on a printing press, large quantities of print media that look visually equivalent to the acceptable proof.

Soft proofing is highly desirable for many reasons. For instance, soft proofing can remove the need to print copies of the media during the proofing process. Moreover, soft proofing may allow multiple proofing specialists to proof color images from remote locations simply by looking at display devices, rather than awaiting delivery of hard copies. Soft proofing can be faster and more convenient than hard proofing. Moreover, soft proofing can reduce the cost of the proofing process. For these and other reasons, soft proofing is highly desirable.

A major problem with soft proofing, however, is the difficulty in achieving a good visual match between the colors displayed on the soft proofing display device and the colors that appear on the actual printed hard copy. As mentioned above, device-independent coordinates theoretically standardize color specification. Thus, theoretically the CMYK device coordinates of a hard copy printout could be converted to device-independent coordinates and then converted to RGB device coordinates. Also, theoretically the colors displayed using the RGB device coordinates would be visually equivalent to those of the hard copy print out. In reality, however, the colors that appear on the display may look different than those of the hard copy printout, even though the images displayed by the soft and hard copy media produce substantially identical device-independent values. Soft proofing cannot work effectively, and gain widespread adoption in the industry, if the colors on the soft proofing display device do not provide an acceptable visual match with the colors on hard copy printouts.

SUMMARY

In one embodiment, a method includes obtaining a white point correction for a display device and obtaining a chromatic correction for the display device. The method may also include generating corrected color coordinates based on the white point and chromatic corrections. Moreover, the method may further comprise obtaining the white point correction by determining a white point correction matrix and obtaining the chromatic correction by determining a chromatic correction matrix.

Determining a white point correction matrix may comprise displaying a color on a display device, the color being defined by an original white point matrix in a known illuminant condition, e.g., D50, and adjusting at least some white point matrix values so that visual appearance on the display device is visually equivalent to a print. Adjusting at least some white point matrix values may comprise adjusting maximum phosphor settings on a display.

Determining a chromatic correction matrix may comprise displaying a color on a display device, the color being defined by an original chromatic matrix in a known illuminant condition, e.g., D50, and adjusting at least some chromatic matrix values so that visual appearance on the display device is visually equivalent to a print. Adjusting at least some chromatic matrix values may comprise adjusting chromaticity values in an RGB color space such as the AdobeRGB(D50) color space.

In another embodiment, a method includes determining device-independent coordinates defining a color on a hard copy, and generating corrected coordinates using the device-independent coordinates, a white point correction and a chromatic correction. Moreover, the method may further comprise displaying the color using the corrected coordinates. The displayed color may be visually equivalent to the color on the hard copy.

The white point correction may be a white point correction matrix and the chromatic correction may be chromatic correction matrix. These matrices may be determined based on characterization of the output of a display device. For instance, determining the white point correction matrix may comprise displaying a color on a display device, the color being defined by an original white point matrix in a known illuminant condition, e.g., D50, and adjusting at least some white point matrix values so that visual appearance on the display device is visually equivalent to a white printout viewed in the known illuminant condition. Moreover, determining the chromatic correction matrix may comprise displaying a color on a display device, the color being defined by an original chromatic matrix in a known illuminant condition, e.g., D50, and adjusting at least some chromatic matrix values so that visual appearance on the display device is visually equivalent to a color printout viewed in the known illuminant condition.

In another embodiment, a method includes converting device-dependent coordinates that define a color in a printing device to device-independent coordinates, and adjusting the device-independent coordinates using a white point correction and a chromatic correction. The method may further comprise converting the corrected device-independent coordinates to device-dependent coordinates that define a color in a display device. Moreover, the method may further comprise displaying the color using the corrected coordinates. The displayed color, for instance, may be visually equivalent to the color on the hard copy. Again, the white point correction may be a white point correction matrix and the chromatic correction may be chromatic correction matrix.

In another embodiment, a method includes adjusting maximum phosphor values for a display device so that a first color displayed on the display device matches white in a defined illuminant condition for a hard copy, and adjusting color settings so that a second color displayed on the display device matches a defined color in the defined illuminant condition. By way of example, the defined illuminant condition may be a D50 illuminant condition.

Adjusting color settings may comprise adjusting color settings within a computer program. For instance, adjusting color settings may comprise adjusting chromaticity values in an RGB color space such as an AdobeRGB(50) color space.

In still another embodiment, a method includes creating a first visual representation of an image on a hard copy, and creating a second visual representation of the image on a display device. The first visual representation and the second visual representation, for instance, may have different device-independent coordinates. However, both white point and saturated colors on the display device may be a good visual match to those of the hard copy. Indeed, both white point and saturated colors on the display may even be visually equivalent to those of the hard copy.

In other embodiments, the invention comprises a system including a display device and memory device coupled to a processor. The processor may perform one or more of the methods described above.

In still other embodiments, the invention comprises a computer readable medium that carries program code that when executed performs one or more of the methods described above.

In still other embodiments, the invention comprises a computer readable medium carrying a color profile data structure thereon. The color profile data structure may correspond to a first device and may include illuminant condition values that do not correspond to actual illuminant conditions associated with the first device. An image rendered on a second device using the color profile data structure may be visually equivalent to the image rendered on the first device.

Additional details of these and other embodiments are set forth in the accompanying drawings and the description below. Other features, objects and advantages will become apparent from the description and drawings, and from the claims.

DETAILED DESCRIPTION

Figure 1:
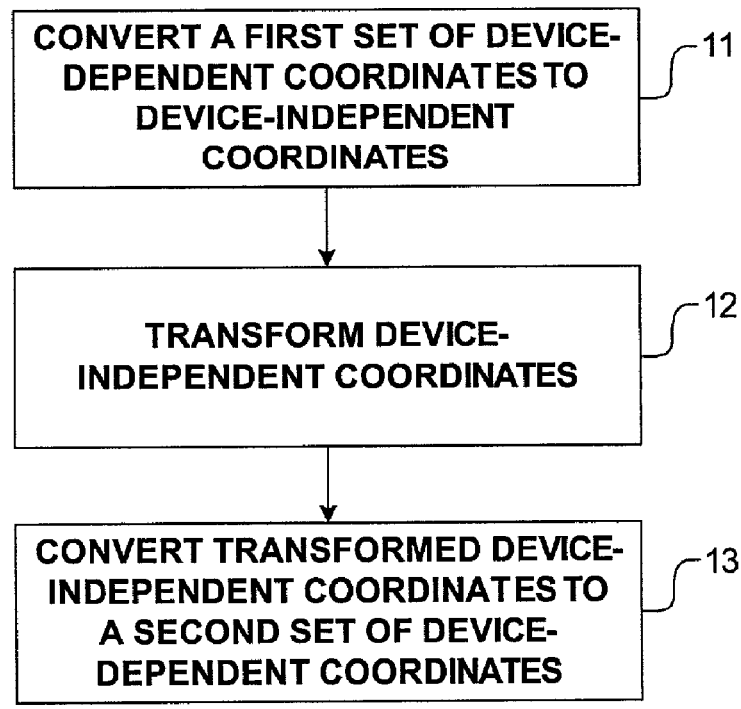
FIGS. 1–5 are flow diagrams according to embodiments of the invention.

In exemplary embodiments, the invention comprises methods, systems and computer readable media carrying program code that facilitate soft proofing. The invention may implement one or more transformation techniques to transform color coordinates between hard copy and soft copy proofing environments. The transformation ensures that color images that appear on a display device will be a visually acceptable match to color images that appear on print media.

In one embodiment, for example, the invention is a method that includes adjusting the maximum phosphor values for a display device so that a first color displayed on the display device matches white in a defined illuminant condition for a hard copy. The method may also include adjusting color settings so that a second color displayed on the display device matches a defined color in the defined illuminant condition. The method may ensure that images that appear on a display device in a soft proofing environment will be visually equivalent to images that appear on print media.

The ultimate goal of soft proofing technology is to facilitate the accurate rendering of color images on a display device. In other words, soft proofing technology seeks to display color images on a display device that are a "visually acceptable match," "visually equivalent," or a "good visual match" to color images on print media. Two images are "visually equivalent" if their empirical delta E error is approximately equal to, or less than 1. A good visual match occurs when a person trained in color management cannot visually identify a difference between the color values of two color images. A visually acceptable match is a match that is acceptable in a soft proofing environment.

As mentioned, two images are "visually equivalent" if their empirical delta E error is approximately equal to, or less than 1. By way of example, the value of empirical delta E can be determined for a single color by displaying an RGB color on a CRT. A hard copy of the color can be placed adjacent to the CRT for comparison. Several operators trained in color management can compare the color on the hard copy to that on the CRT, and can adjust the RGB value of the color on the CRT so the color on the CRT matches that of the hard copy. If necessary, effects of scattered light can be eliminated by viewing and comparing the two colors through a telescopic-like tube. If the average of the corrections determined by the operators is near zero for R, G, and B, the CRT and hard copy colors may be said to have an empirical delta E that is near zero. If the average deltas are non-zero, the empirical delta E can be determined by converting RGB to L*a*b* using the display ICC profile for the original RGB and the average adjusted RGB. The delta E can then be computed from the L*a*b* values.

Imaging devices include printing devices and display devices. Printing devices may include, for example, laser printers, ink jet printers, thermal imagers, dot matrix printers, printing presses or any other device capable of printing to tangible media such as paper or film. Display devices include cathode ray tubes (CRTs), liquid crystal displays (LCDs) and other flat screen displays, digital paper, electronic ink displays, and any other device capable of rendering images from electronic input signals or data.

Typically, printing devices and display devices both make use of device-dependent coordinates to define color. Printing devices, for instance, typically use CMYK or CMYKOG coordinates to define color, and therefore, printing devices may have an associated CMYK gamut or CMYKOG gamut defining the color capabilities of the printing device. Many display devices currently use RGB coordinates to define color, and therefore, typically have an associated RGB gamut that defines the color capabilities of the display device. A CRT display device, for instance, makes use of different combinations of red, green and blue phosphors that can display colors within the RGB gamut of the device.

The visual appearance of a color, however, is also dependent on illuminant conditions. For instance, the same printout may look different when viewed under different lighting. For this reason, the illuminant condition is generally a fixed variable when comparing colors defined by one or more color spaces. The illuminant condition is important in both hard copy and soft proofing environments.

Experimental research has uncovered an apparent breakdown in color science as defined by the CIE standards. In particular, a display device and printing device can produce color images that have the same measured XYZ coordinates, yet the images can look visually different. For example, CRT displays that are calibrated to a D50 illuminant condition look yellow when compared to printed images with the same XYZ coordinates viewed in a D50 illuminant condition.

Theoretically, images with the same measured XYZ coordinates should appear to be identical. Unfortunately, it appears that this is not necessarily the case for a visual comparison of hard copy and soft images. Thus, to achieve color matching between images on a display device and images printed on hard copy media that is of "proofing quality," i.e., a visually acceptable match, visually equivalent or a good visual match, transformation of the XYZ coordinates in accordance with the invention may be necessary.

FIG. 1 is a flow diagram illustrating a color transformation process according to an embodiment of the invention. As shown in FIG. 1, a first set of device-dependent coordinates are converted to device-independent coordinates (11). The device-independent coordinates are then transformed (12). The transformed device-independent coordinates are then converted to a second set of device-dependent coordinates (13). The process of FIG. 1, for instance, can be performed on all of the pixels in a color image so that the output of a second imaging device, e.g., a display, looks visually equivalent to the output of a first imaging device, e.g., a printer.

Figure 2:
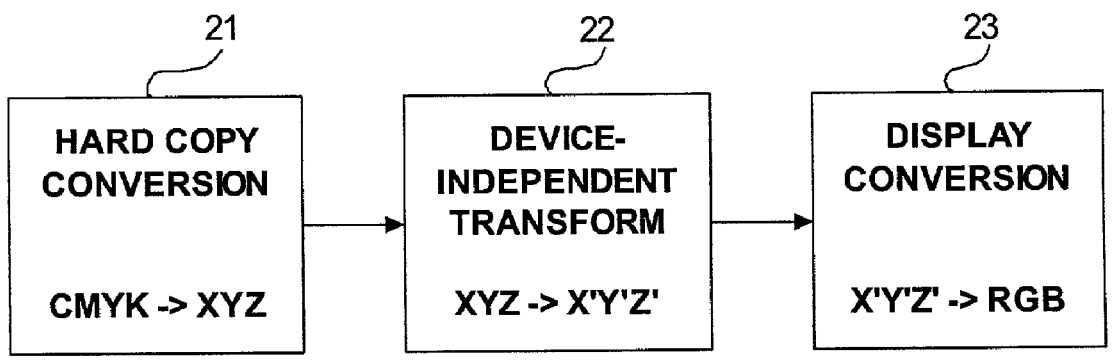

FIG. 2 is a flow diagram illustrating one implementation of the process of FIG. 1. As shown, the image data of a hard copy CMYK image is converted from CMYK coordinates to XYZ coordinates (21). The XYZ coordinates are then transformed to X'Y'Z' (22). These transformed X'Y'Z' coordinates can then be converted to RGB coordinates (23) for presentation on a display device for soft proofing. In this manner, the output of a display device using the RGB coordinates can be made to be visually equivalent to a hard copy printed with the CMYK coordinates.

Figure 3:
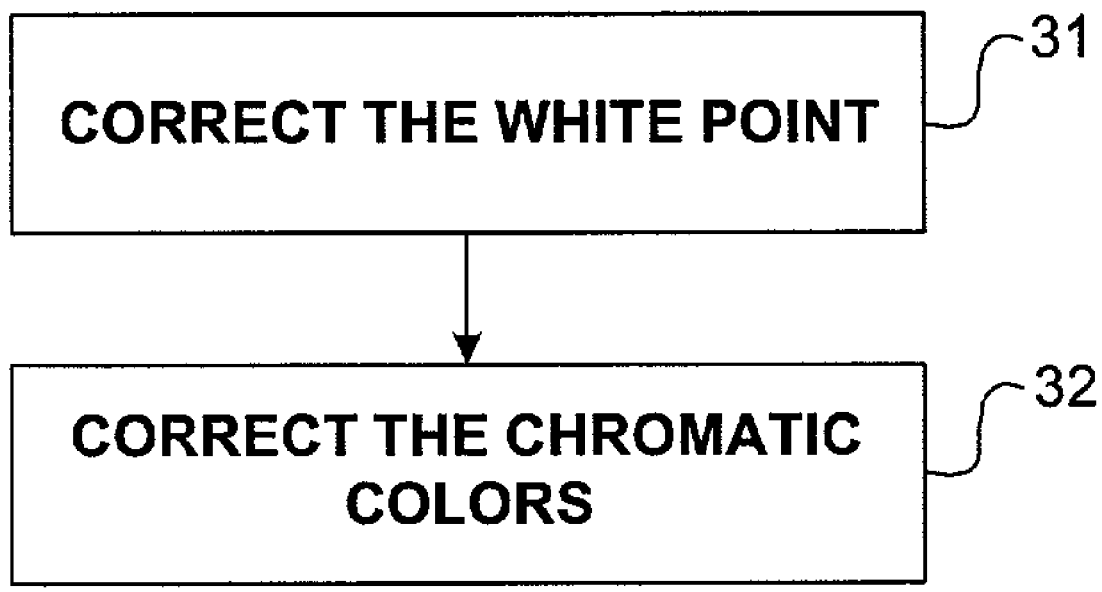

FIG. 3 is a flow diagram of a general process that can be implemented to transform device-independent coordinates. As shown, a white point is corrected (31) and then chromatic colors are corrected (32). Bifurcating the transformation process in this manner can yield accurate color matching results.

Referring again to FIG. 1, the first set of device-independent coordinates may be associated with a first device. For instance, the first device may be printer that prints color images according to a CMYK gamut. The color image may be comprised of a collection of device-dependent coordinates that define the colors of the points in the image.

For example, an image may be comprised of image data that includes a large collection of CMYK coordinates. Each of these coordinates can be converted to device-independent coordinates (11), and then transformed (12). Each transformed coordinate may then be converted to form a second set of device-dependent coordinates (13).

The second set of device-dependent coordinates, for example, may be associated with a second imaging device. For instance, if the second imaging device is a display device such as a CRT, the second set of device-dependent coordinates may be a collection of RGB coordinates. Each RGB coordinate can be generated from the transformed coordinates.

The transformation operation (12) is important in obtaining accurate color matching. Transformation (12) adjusts device-independent coordinates to ensure that the output on a display device, for example, looks substantially the same as the print out of a printer. While this transformation may be "theoretically" unnecessary, given the widely-accepted CIE color equations, the general breakdown in color science discussed above mandates the use of this transformation, especially in the field of soft proofing where color matching is critical. Thus, the invention compensates for color matching deficiencies that arise in the conventional XYZ transformations in the context of hard copy to soft copy matching.

Referring again to FIG. 3, a bifurcated transformation of device-independent coordinates is illustrated. By way of example, the white point of a display device can be corrected (31) by starting with a known illuminant condition such as D50. For instance, a white surface can be placed in a viewing booth having D50 lighting to define a white point. Reflectance of the white surface can be measured in terms of device-independent coordinates such as $L^*a^*b^*$. At this point, a white area with the same $L^*a^*b^*$ values can be created and displayed on a display device using commercially available software such as Adobe® PhotoShop®, available from Adobe Systems, Inc. of San Jose, Calif. Next, the x and y chromaticities of the white point on the display device can be adjusted until the white image on the display device and the white image in the viewing booth are either visually equivalent, a good visual match, or a visually acceptable match. The adjustments to the x and y chromaticities of the white point should be noted. Having made the adjustments, the display device may be categorized as being calibrated to a "visual D50" white point. In this case, the white points presented by the display and hard copy produce slightly different XYZ values, but appear to be a visual match.

After correcting the white point (31), the chromatic colors may be corrected (32). The correction to the chromatic colors, for example, may be categorized as a correction to the saturated colors in the device gamut. For instance, if the correction is being applied to a CRT defined by an RGB gamut, the correction to the chromatic colors may be an adjustment to the R, G, and B chromaticities.

In one example, the correction to the chromatic colors involves first determining correction values. To do this, a CMYK image should be converted to digital form. For example, a CMYK image can be convened to AdobeRGB (D50) using absolute rendering intent with an accurate Matchprint™ profile as measured by a spectrophotometer, i.e., a profile for the output of an Imation Matchprint™ laser proofer commercially available from Imation Corp. of Oakdale, Minn. Optimally, the image used for comparison should contain 100% solids and overprints of C, M, Y, R (e.g., M+Y), G (e.g., C+Y), and B (e.g., C+M), although the invention is not limited in that respect. At this point, the RGB working space should be set to AdobeRGB(D50). The digital image can be compared to the CMYK Matchprint™ hard copy in a viewing station and the R, G, and B chromaticities of the AdobeRGB(D50) working space can be adjusted until either a visually acceptable match or a good visual match is achieved, or until the two images are visually equivalent. Again, the adjustments to the R, G, and B chromaticities of the display device working space should be noted.

Figure 4:
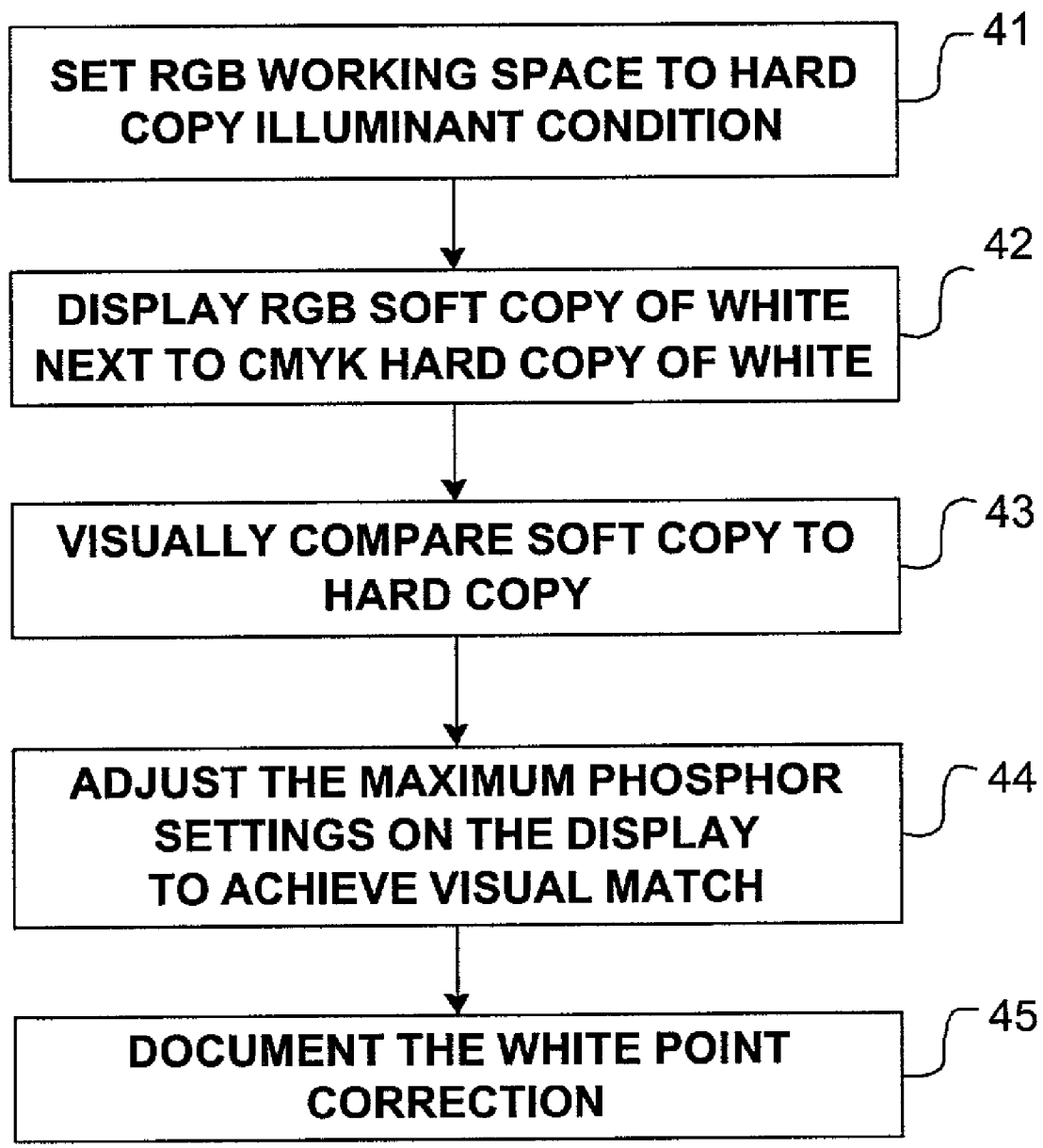

FIG. 4 is another flow diagram according to an embodiment of the invention. In particular, FIG. 4 illustrates one method that can be implemented to correct a white point in a soft proofing setting. As shown, an RGB working space is first set to the hard copy illuminant condition (41). Again, for example, the illuminant condition may be a D50 illuminant condition.

After setting the illuminant condition in the RGB working space (41), an RGB soft copy of white can be displayed next to a CMYK hard copy of white (42). For example, a white area with the same L*a*b* values as that of a white CMYK hard copy can be created in the RGB working space and displayed next to the CMYK hard copy. The illuminant condition illuminating the CMYK hard copy should still be D50. The soft copy of white can then be visually compared to the hard copy white (43).

Having compared the hard copy white to the soft copy white, the maximum phosphor settings on the display device can be adjusted to achieve a visual match between the hard copy and soft copy (44). The phosphor settings can be incrementally adjusted by a user, for instance, until the white that appears on the display looks the same as the white on the hard copy. Once a visual match of white is achieved, the amount of adjustment to the phosphor settings can be documented (45).

Figure 5:
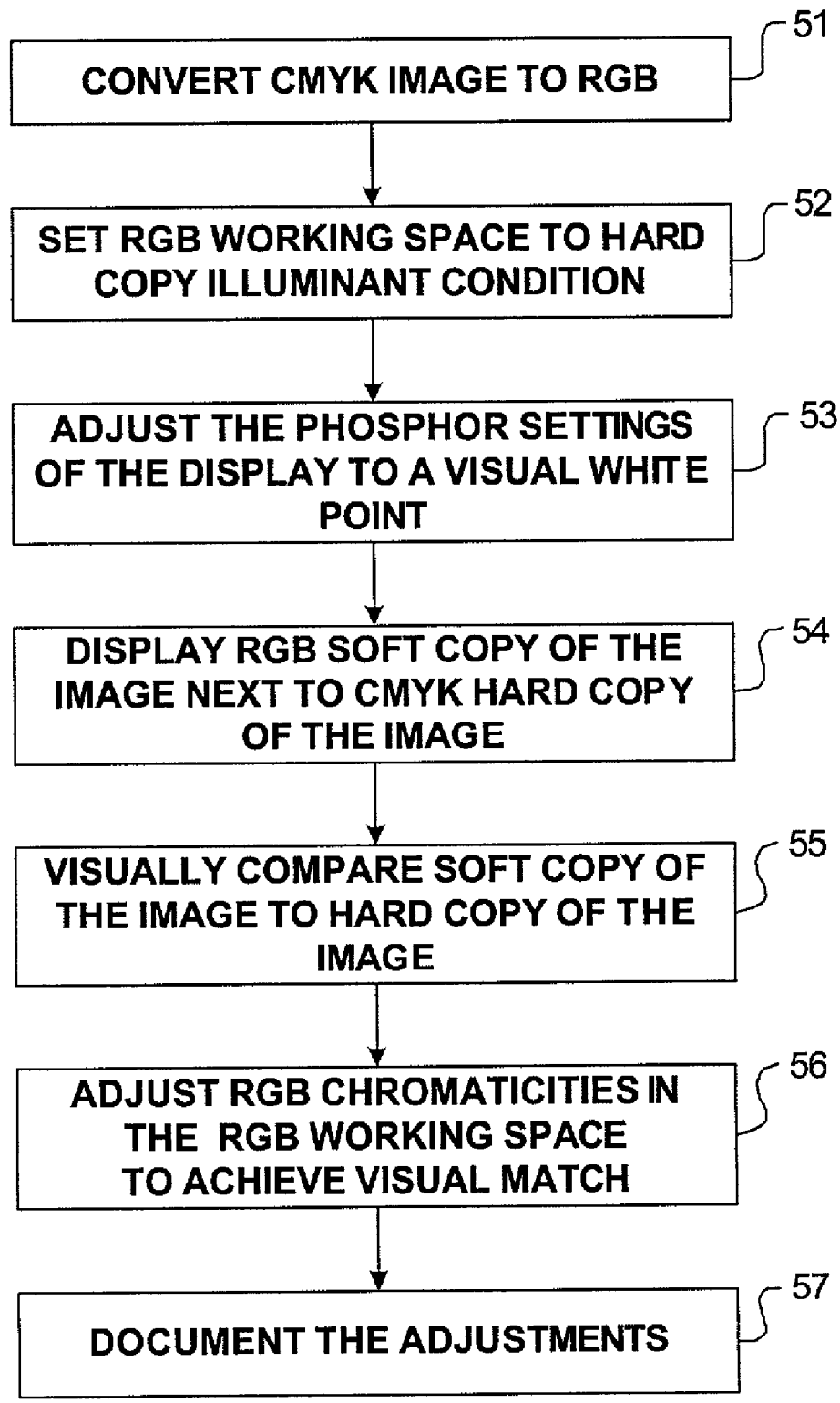

FIG. 5 is another flow diagram according to an embodiment of the invention. As shown, a CMYK image is converted to RGB coordinates (51). For example, a CMYK image can be converted to AdobeRGB(D50) using absolute rendering intent with an accurate Matchprint™ profile as measured by a spectrophotometer, i.e., a profile for the output of an Imation Matchprint™ laser proofer commercially available from Imation Corp. of Oakdale, Minn. Optimally, the image should contain 100% solids and overprints of C, M, Y, R, G, and B, although the invention is not limited in that respect.

After converting the CMYK image to RGB, the working space can be set according to the hard copy illuminant condition (52). For example if the hard copy illuminant condition is D50, the RGB working space should be set to AdobeRGB(D50). Once the working space is set (52), the phosphor settings of the display can be adjusted to correspond to a visual white point (53). FIG. 4, for example, illustrates an appropriate method for determining a visual white point of a display.

At this point, an RGB soft copy of the image can be displayed next to a CMYK hard copy of the image (54). Again, the CMYK hard copy should still be illuminated with a D50 illuminant. The hard copy of the image can then be visually compared to the soft copy of the image (55). A viewing station, for example, may be implemented to ensure that D50 illuminant conditions are achieved when the soft copy is compared to the hard copy.

The R, G, and B chromaticities of the AdobeRGB(D50) working space can be adjusted to achieve a visual match between the hard copy and the soft copy of the image (56). For instance, the chromaticities of the AdobeRGB(D50) working space can be incrementally adjusted by a user until the colors that appear on the display look the same as the colors on the hard copy. The adjustments to the chromaticities can then be documented (57).

Having determined and documented the corrections to the white point and the chromaticities, the transformation can be repeated by inputting the correction values into a mathematical framework as outlined below. Moreover, after performing the mathematical transformation from XYZ to X'Y'Z' outlined below, a new profile such as an ICC profile can be created to allow CMYK images rendered with the corrected ICC profile to look the same as the RGB images that were visually corrected by modifying the AdobeRGB chromaticities. An ICC profile would conform to existing specifications published by the International Color Consortium (ICC) for characterization of device characteristics.

One implementation of the transformation uses matrix algebra to realize very accurate matching results. The total resulting XYZ to X'Y'Z' correction transform can be described as follows:

$$\begin{pmatrix} X_{Corr} \\ Y_{Corr} \\ Z_{Corr} \end{pmatrix} =$$

$$M_{Corr} \begin{pmatrix} X \\ Y \\ Z \end{pmatrix} = M_1(\Delta x_{D50}, \Delta y_{D50}) M_2(\Delta x_r, \Delta y_r, \Delta x_g, \Delta y_g, \Delta x_b, \Delta y_b) \begin{pmatrix} X \\ Y \\ Z \end{pmatrix}$$

where the first matrix $M_1$ performs a correction to XYZ with regard to the white point and $M_2$ performs a correction to the chromaticities.

The $M_1$ correction effectively rescales the maximum R, G, and B intensities of phosphors in a display device such that the white point of the display device at RGB(max) measures $x_{D50}+\Delta x_{D50}$, $y_{D50}+\Delta y_{D50}$ rather than $x_{D50}$, $y_{D50}$. The variables $\Delta x_{D50}$ and $\Delta y_{D50}$ modify the theoretical D50 white point to account for visible differences. Thus, $x_{D50}+\Delta x_{D50}$, $y_{D50}+\Delta y_{D50}$ define the visual white point.

The $M_2$ correction modifies the XYZ values such that the saturated colors of the display device measure $x_{r2}+\Delta x_{r2}$, $y_{r2}+\Delta y_{r2}$; $x_{g2}+\Delta x_{g2}$, $y_{g2}+\Delta y_{g2}$; and $x_{b2}+\Delta x_{b2}$, $y_{b2}+\Delta y_{b2}$, rather then $x_{r2}$, $y_{r2}$; $x_{g2}$, $y_{g2}$; and $x_{b2}$, $y_{b2}$. The sets of variables $\Delta x_{r2}$, $\Delta y_{r2}$; $\Delta x_{g2}$, $\Delta y_{g2}$; and $\Delta x_{b2}$, $\Delta y_{b2}$ modify the theoretical RGB chromaticities to account for visible differences.

The white point correction matrix $M_1$ can be written as:

$$M_1(\Delta x_{D50}, \Delta y_{D50}) = M(x_{r_1}, y_{r_1}, x_{g_1}, y_{g_1}, x_{b_1}, y_{b_1}, x_{D50} + \Delta x_{D50}, y_{D50} + \Delta y_{D50}) M^{-1}(x_{r_1}, y_{r_1}, x_{g_1}, y_{g_1}, x_{b_1}, y_{b_1}, x_{D50}, y_{D50})$$

$$M_1(\Delta x_{D50}, \Delta y_{D50}) = M(x_{D50} + \Delta x_{D50}, y_{D50} + \Delta y_{D50}) M^{-1}(x_{D50}, y_{D50})$$

Although the matrix M is actually a function of RGB chromaticities and white point chromaticities, the notation has been simplified to indicate that the only parameters that are varying are the corrections to the white point. The RGB chromaticities can be considered constant when calculating the white point correction matrix $M_1$.

The matrix M defines the conversion from linear RGB space with a set of RGB phosphors to measured XYZ for a particular CRT display that is set to a measured white point of chromaticity x, y. The values of the $\Delta x_{D50}$ and $\Delta y_{D50}$ indicate the visual correction required to the chromaticity of D50 necessary to match the display device to a neutral white reflector illuminated in a viewing station with D50 illuminant.

To define M as a function of just chromaticities the expression begins as a description of matrix M in terms of the measured tristimulus values X, Y, and Z for R, G, and B. The values of XYZ relate to chromaticity values x, y according to the equations:

$$X = xY/y$$
$$Z = zY/y = (1 - x - y)Y/y$$

Thus, $$\begin{pmatrix} X \\ Y \\ Z \end{pmatrix} = M \begin{pmatrix} R \\ G \\ B \end{pmatrix}$$

$$M = \begin{pmatrix} X_r & X_g & X_b \\ Y_r & Y_g & Y_b \\ Z_r & Z_g & Z_b \end{pmatrix}$$

$$M(x_{r_1}, y_{r_1}, z_{r_1}, Y_{r_1}, x_{g_1}, y_{g_1}, z_{g_1}, Y_{g_1}, x_{b_1}, y_{b_1}, z_{b_1}, Y_{b_1}) =$$

$$\begin{pmatrix} (x_{r_1}/y_{r_1})Y_{r_1} & (x_{g_1}/y_{g_1})Y_{g_1} & (x_{b_1}/y_{b_1})Y_{b_1} \\ (y_{r_1}/y_{r_1})Y_{r_1} & (y_{g_1}/y_{g_1})Y_{g_1} & (y_{b_1}/y_{b_1})Y_{b_1} \\ (z_{r_1}/y_{r_1})Y_{r_1} & (z_{g_1}/y_{g_1})Y_{g_1} & (z_{b_1}/y_{b_1})Y_{b_1} \end{pmatrix}$$

$$M(x_{r_1}, y_{r_1}, z_{r_1}, Y_{r_1}, x_{g_1}, y_{g_1}, z_{g_1}, Y_{g_1}, x_{b_1}, y_{b_1}, z_{b_1}, Y_{b_1}) =$$

$$M_c(x_{r_1}, y_{r_1}, z_{r_1}, x_{g_1}, y_{g_1}, z_{g_1}, x_{b_1}, y_{b_1}, z_{b_1}) \begin{pmatrix} Y_{r_1} & 0 & 0 \\ 0 & Y_{g_1} & 0 \\ 0 & 0 & Y_{b_1} \end{pmatrix}$$

where $M_c$ is a chromaticity matrix given by:

$$M_c(x_{r_1}, y_{r_1}, z_{r_1}, x_{g_1}, y_{g_1}, z_{g_1}, x_{b_1}, y_{b_1}, z_{b_1}) =$$

$$\begin{pmatrix} x_{r_1}/y_{r_1} & x_{g_1}/y_{g} & x_b/y_{b_1} \\ y_{r_1}/y_{r_1} & y_{g_1}/y_{g_1} & y_{b_1}/y_{b_1} \\ z_{r_1}/y_{r_1} & z_{g_1}/y_{g_1} & z_{b_1}/y_{b_1} \end{pmatrix}$$

The chromaticity matrix $M_c$ can be further reduced to a function of just the x, y chromaticities for R, G, and B as follows:

$$M_c(x_{r_1}, y_{r_1}, x_{g_1}, y_{g_1}, x_{b_1}, y_{b_1}) =$$

$$\begin{pmatrix} x_{r_1}/y_{r_1} & x_{g_1}/y_{g_1} & x_{b_1}/y_{b_1} \\ 1 & 1 & 1 \\ (1 - x_{r_1} - y_{r_1})/y_{r_1} & (1 - x_{g_1} - y_{g_1})/y_{g_1} & (1 - x_{b_1} - y_{b_1})/y_{b_1} \end{pmatrix}$$

If the RGB chromaticities are fixed, the chromaticity matrix $M_c$ is a fixed matrix.

In order to obtain the matrix M as a function of the chromaticity matrix $M_c$ and the white point chromaticities, the equations can be solved as follows:

$$\begin{pmatrix} X_{wp} \\ Y_{wp} \\ Z_{wp} \end{pmatrix} = M \begin{pmatrix} R = 1 \\ G = 1 \\ B = 1 \end{pmatrix}$$

$$\begin{pmatrix} X_{wp} \\ Y_{wp} \\ Z_{wp} \end{pmatrix} = M_c \begin{pmatrix} Y_{r_1} & 0 & 0 \\ 0 & Y_{g_1} & 0 \\ 0 & 0 & Y_{b_1} \end{pmatrix} \begin{pmatrix} R = 1 \\ G = 1 \\ B = 1 \end{pmatrix}$$

$$\begin{pmatrix} X_{wp} \\ Y_{wp} \\ Z_{wp} \end{pmatrix} = M_c \begin{pmatrix} Y_{r_1} \\ Y_{g_1} \\ Y_{b_1} \end{pmatrix}$$

$$\begin{pmatrix} Y_{r_1} \\ Y_{g_1} \\ Y_{b_1} \end{pmatrix} = M_c^{-1} \begin{pmatrix} X_{wp} \\ Y_{wp} \\ Z_{wp} \end{pmatrix}$$

This equation can be expressed as a function of white point chromaticities:

$$\begin{pmatrix} Y_{r_1}(x_{wp}, y_{wp}) \\ Y_{g_1}(x_{wp}, y_{wp}) \\ Y_{b_1}(x_{wp}, y_{wp}) \end{pmatrix} = M_c^{-1} \begin{pmatrix} x_{wp}/y_{wp} \\ 1 \\ (1 - x_{wp} - y_{wp})/y_{wp} \end{pmatrix}$$

Thus the resulting equation for M is a function of RGB and white point chromaticities only. By assuming that the RGB chromaticities are fixed, this becomes a function of white point only:

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_1})$$

$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

Hence, the expression used to determine the white point correction matrix $M_1$ can be expressed as:

$$M(x_{wp}, y_{wp}) = M_c \begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

The chromatic correction matrix $M_2$, i.e., the saturated color correction matrix or RGB chromaticity correction matrix can be determined in a manner similar to the way the white point correction matrix $M_1$ was determined above. However, to determine and reduce the expression of $M_2$, the white point chromaticities are assumed fixed and the RGB chromaticities are the variables.

The white point correction matrix $M_1$ can be applied to correct errors between a theoretical white point of a display device and the empirical white point, e.g., a visual white point. The chromatic correction matrix $M_2$ can be applied to correct the remaining errors in the saturated colors. In other words the $M_2$ matrix can correct errors between the theoretical values of saturated colors and empirically or visually measured values of the saturated colors. The $M_2$ matrix can be applied to adjust a physical monitor, or alternatively, can be applied to adjust a working space such as AdobeRGB or sRGB.

For instance, if the chromatic correction $M_2$ matrix will be applied to adjust a working space, it can be expressed as:

$$M_2(\Delta x_r, \Delta y_r, \Delta x_g, \Delta y_g, \Delta x_b, \Delta y_b) = M(x_{r_2} + \Delta x_{r_2}, y_{r_2} + \Delta y_{r_2}, x_{g_2} + \Delta x_{g_2}, y_{g_2} + \Delta y_{g_2}, x_{b_2} + \Delta x_{b_2}, y_{b_2} + \Delta y_{b_2}, x_{wp}, y_{wp}) \times M^{-1}(x_{r_2}, y_{r_2}, x_{g_2}, y_{g_2}, x_{b_2}, y_{b_2}, x_{wp}, y_{wp})$$

where $x_{wp}, y_{wp}$ are assumed to be $x_{D50}, y_{D50}$, and $x_{r2}, y_{r2}, x_{g2}, y_{g2}$, and $x_{b2}, y_{b2}$ are the chromaticities of the RGB working space.

The white point correction, the chromatic correction, or both, can be stored in a color profile. A color profile is a data structure that describes the color characteristics of a particular device. Color profiles typically include color information such as information describing how the device converts from device-independent coordinates to device-dependent coordinates. By storing either the correction variables or redefining the color profile to include transformations like those described above, the color profile can enhance and improve soft proofing systems.

To achieve compatibility with existing systems and standards, a profile can include and yet hide the transformation data. For instance, an ICC profile including transformation data associated with resealing of the RGB phosphors, for example, may still be characterized by a true D50 white point $x_{D50}, y_{D50}$ in the profile. In actuality however, the white point may in fact measure $x_{D50}+\Delta x_{D50}, y_{D50}+\Delta y_{D50}$ and XYZ values for RGB derived from the actual measured RGB chromaticities. When a system implements the profile, an accurate color match can be achieved.

From a somewhat broader perspective, the invention may comprise a multi-step transformation of device-independent coordinates. While experimental results have shown that the bifurcated transformation technique outlined above yields good color matching results, the transformation process could be broken up even further. Moreover, the transformation could be implemented in device-independent color spaces other than an XYZ color space. Referring again to the XYZ example, however, a more general correction can be represented by the equation:

$$\begin{pmatrix} X_{Corr} \\ Y_{Corr} \\ Z_{Corr} \end{pmatrix} = M_{Corr} \begin{pmatrix} X \\ Y \\ Z \end{pmatrix} = M_1(\Delta x_1, \Delta y_1) M_2(\Delta x_2, \Delta y_2) \ldots M_n(\Delta x_n, \Delta y_n) \begin{pmatrix} X \\ Y \\ Z \end{pmatrix}$$

The matrices $M_1$–$M_n$ may make the corrections to different chromaticities. By way of example, $M_1$ could correct white point chromaticity, $M_2$ could correct red chromaticity, $M_3$ could correct green chromaticity, $M_4$ could correct blue chromaticity, and so forth.

In general, each matrix in the collection of matrices $M_1$–$M_n$ can be described as follows. If you let $M_{Component\ Transform}$ ($M_{CT}$) represent any matrix in the set of matrices $\{M_1$–$M_n\}$ then $M_{CT}=(M_{Experimental})(M_{Theoretical})^{-1}$. The matrix $M_{Theoretical}$ defines the conversion from device-dependent space to device-independent space according to the theories of color science. The matrix $M_{Experimental}$ defines the conversion from device-dependent space to device-independent space according to experimental results such as visual comparison. If the theories of color science are empirically robust, then $M_{Theoretical}$ will be the same as $M_{Experimental}$, and $(M_{Experimental})(M_{Theoretical})^{-1}$ will yield an $M_{CT}$ that is an identity matrix. However, if the theories of color science break down and $M_{Theoretical}$ is not the same as $M_{Experimental}$, $M_{CT}$ will not be an identity matrix; but rather, $M_{CT}$ will be the transform matrix for yielding a color match for that respective chromaticity.

Figure 6:
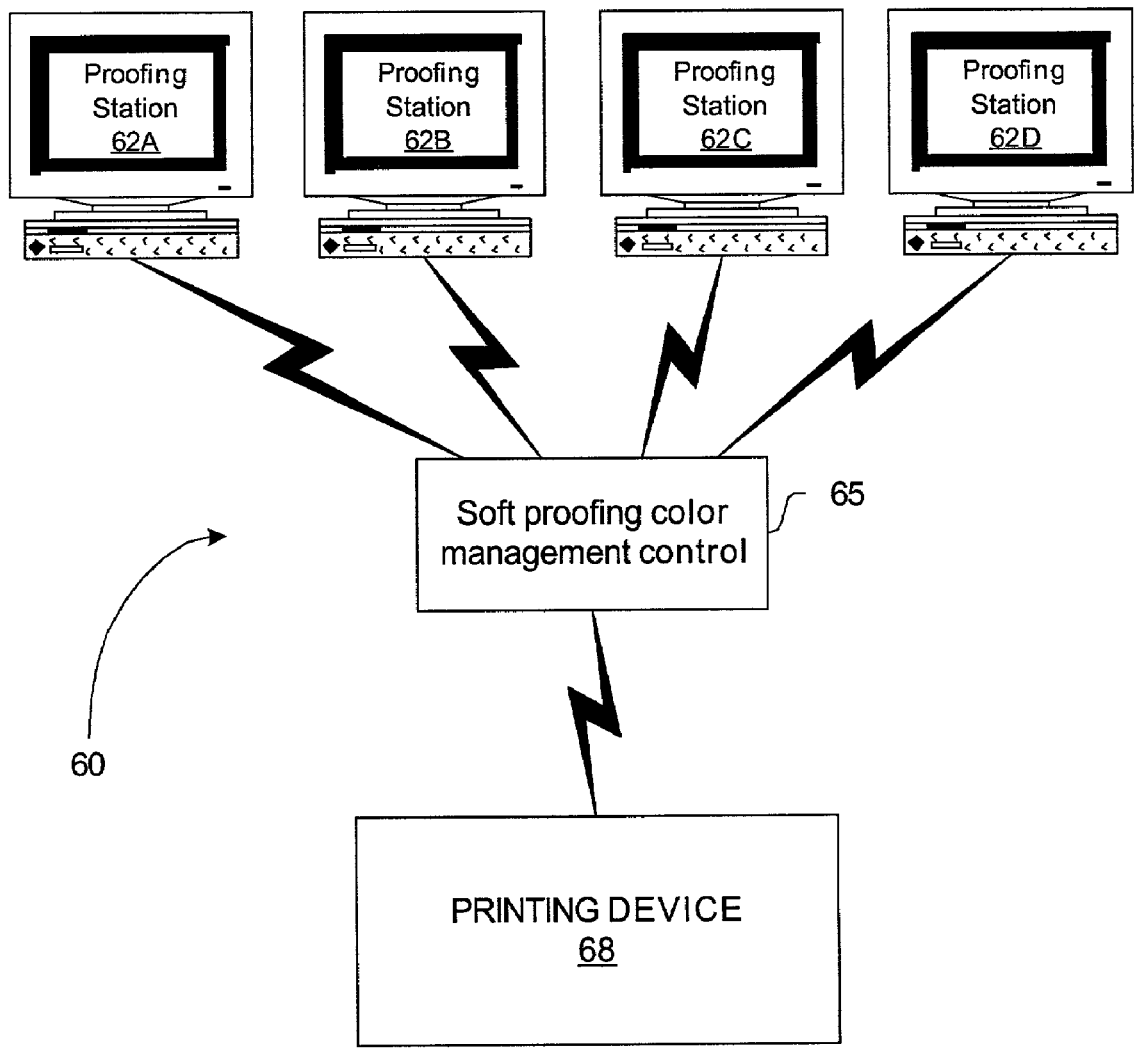
FIG. 6 illustrates an exemplary soft proofing system according to an embodiment of the invention.

FIG. 6 illustrates an exemplary soft proofing system according to an embodiment of the invention. A soft proofing system suitable for implementation of techniques for color transformation can include one or more proofing stations 62A–62D. Each proofing station 62A–62D, for example may include a processor, a user input device, a display monitor, memory, a storage device and a printer. The proofing stations may substantially conform to conventional computer systems used by graphic artists and other users in the creation of textual and graphic imagery for electronic display or print reproduction. A memory/bus controller and system bus couple processor and memory, while one or more I/O controllers and I/O bus couple the processor and memory to user input device, display monitor, storage device, and printer.

The processor may take the form of a general purpose microprocessor and can be integrated with or form part of a PC, Macintosh, computer workstation, hand-held data terminal, palm computer, digital paper, or the like. The user input device may include a conventional keyboard and pointing device such as a mouse, pen, or trackball, if desired. The monitor may include a CRT, flat panel display, or the like, that displays textual and/or graphic information to the user. The memory may include random access memory (RAM) storing program code that is accessed and executed by processor to carry out color transformation techniques.

The program code can be loaded into the memory from a storage device, which may take the form of a fixed hard drive or removable media drive associated with the system. For example, the program code can be initially carried on computer-readable media such as magnetic, optical, magneto-optic, phase-change, or other disk or tape media. Alternatively, the program code may be loaded into memory from electronic computer-readable media such as EEPROM, or downloaded over a network connection. If downloaded, the program code may be initially embedded in a carrier wave or otherwise transmitted on an electromagnetic signal. The program code may be embodied as a feature in an application program providing a wide range of functionality.

Soft proofing system 60 may also include soft proofing color management control 65 coupled to the respective proofing stations 62A–62D. The soft proofing color management control 65, for example, may input image data to the respective proofing stations 62A–62D. The image data, for example may be transformed by color management control 65, before being sent to proofing stations 62A–62D. Alternatively, image data may be transformed by each respective proofing station 62A–62D after being sent from the color management control 65.

Soft proofing system 60 may also be associated with at least one printing device 68 such as a printing press. In operation, soft proofing system 60 may generate a color image at the respective proofing stations 62A–62D. Color specialists may inspect the image at respective proofing stations 62A–62D and the visual appearance of the image may be adjusted to their liking. Once the image looks acceptable at the proofing stations 62A–62D, printing device 68 may be used to mass print large quantities print media that look visually equivalent to the image displayed at the proofing stations 62A–62D. Importantly, implementing the techniques and teachings outlined above can help ensure that the images printed by printing device 68 will appear visually equivalent to the images that appear at the proofing stations 62A–62D.

An accurate soft proofing system can be realized based on the assumption that a simple matrix-based correction to XYZ will result in a good correlation between CRT displays and reflective hard copies. This correction can either be formulated as correcting hard copy XYZ values to the corresponding CRT XYZ values:

$$\begin{pmatrix} X_{CRT} \\ Y_{CRT} \\ Z_{CRT} \end{pmatrix} = M_{HC \to CRT} \begin{pmatrix} X_{HC} \\ Y_{HC} \\ Z_{HC} \end{pmatrix} =$$

$$M_1(\Delta x_{D50}, \Delta y_{D50}) M_2(\Delta x_r, \Delta y_r, \Delta x_g, \Delta y_g, \Delta x_b, \Delta y_b) \begin{pmatrix} X_{HC} \\ Y_{HC} \\ Z_{HC} \end{pmatrix}$$

or correcting CRT XYZ values to the corresponding hard copy XYZ values:

$$\begin{pmatrix} X_{HC} \\ Y_{HC} \\ Z_{HC} \end{pmatrix} = M_{HC \to CRT}^{-1} \begin{pmatrix} X_{HC} \\ Y_{HC} \\ Z_{HC} \end{pmatrix} =$$

$$M_2^{-1}(\Delta x_r, \Delta y_r, \Delta x_g, \Delta y_g, \Delta x_b, \Delta y_b) M_1^{-1}(\Delta x_{D50}, \Delta y_{D50}) \begin{pmatrix} X_{CRT} \\ Y_{CRT} \\ Z_{CRT} \end{pmatrix}$$

The examples below illustrate ways in which this transform can be used.

EXAMPLE 1

The matrix $M_{HC \to CRT}^{-1}$ can be applied automatically in the driver software or EPROM of the device that measures XYZ (or equivalent) measurement data. Thus, all analog and digital settings of the CRT (most notably the white point or color temperature setting) will automatically correlate well to the illuminant chosen for viewing reflective images. Furthermore, all measured XYZ data will be automatically corrected. If the measurement device is used to set a D50 white point on the CRT, then an ICC profile can be generated in the standard manner. A good visual match between CRT and hard copy will occur.

Some color measurement tools such as Kodak Color-Flow™ and Gretag-Macbeth ProfileMaker™ measure 100% R, G, B, and a series of gray colors ranging from black to white. In addition, other ICC tools may measure extra combinations of RGB color values. The most common result is a simple matrix/TRC profile based directly on the XYZ measured data. In the case where the CRT is not set to a D50 white point, a chromatic adoption can be applied to the data in order to adjust it to D50.

These measurement tools, however, are hampered by the fact that the XYZ data of the CRT is not visually consistent with the XYZ data measured for other media. Thus, to achieve a good visual match between devices and media, the $M_{HC \to CRT}^{-1}$ matrix can be applied automatically to the CRT XYZ data. This conversion can be applied for all situations involving measurement, including specifications of CRT's and control of CRTs, relative to the hard copy.

Suppliers of operating systems and/or CRT hardware can implement the current invention to achieve good visual matches between their CRTs and various printers. For instance, a good visual match can be achieved by first correcting all XYZ data used to define the automatic CRT setup conditions (such as white point or color temperature) using the $M_{HC \to CRT}^{-1}$ matrix. Second, using the $M^{HC \to CRT-1}$ matrix, all XYZ data used to generate the ICC profiles can be corrected automatically to characterize the CRT for a particular setup condition.

In other words, the current invention can be used to redefine of the CIE specification for color with respect to CRTs. Moreover, this redefinition can be used for any color metric, including specifically soft proofing applications.

EXAMPLE 2

The matrix $M_{HC \to CRT}$ can be applied to the XYZ values of the illuminant for hard copy (e.g. D50) in order to derive the corresponding CRT white point values in XYZ for the CRT:

$$\begin{pmatrix} X_{CRT} \\ Y_{CRT} \\ Z_{CRT} \end{pmatrix} = M_{HC \to CRT} \begin{pmatrix} X_{HC} \\ Y_{HC} \\ Z_{HC} \end{pmatrix} = M_{HC \to CRT} \begin{pmatrix} X_{D50} \\ Y_{D50} \\ Z_{D50} \end{pmatrix} = M_{HC \to CRT} \begin{pmatrix} 0.9642 \\ 1.000 \\ 0.8249 \end{pmatrix}$$

The uncorrected ICC profile for the CRT can be constructed from the combination of chromaticity and white point values for the CRT.

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_1})$$

$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

The corrected matrix can then be calculated by simply applying the transform to convert from CRT XYZ to hard copy XYZ and then re-computing the chromaticity values in the expression above. Alternatively, the correction can be separated into a white point correction and chromatic correction.

If the CRT has been set physically to a corrected visual white point (e.g. $M_{HC \to CRT}(XYZ_{D50})$), then by definition the corrected values of CRT white point chromaticities $x_{wp}, y_{wp}$ going from CRT to hard copy will be $x_{D50}, y_{D50}$. This is because the corrected values of XYZ (going from CRT back to HC) will be D50 for the CRT white:

$$\begin{pmatrix} X_{D50} \\ Y_{D50} \\ Z_{D50} \end{pmatrix} = M_{HC \to CRT}^{-1} M_{HC \to CRT} \begin{pmatrix} X_{D50} \\ Y_{D50} \\ Z_{D50} \end{pmatrix} = M_{HC \to CRT}^{-1} \begin{pmatrix} X_{WPCRT} \\ Y_{WPCRT} \\ Z_{WPCRT} \end{pmatrix}$$

Thus the CRT matrix that is corrected for CRT to hard copy will automatically have the value of desired white point chromaticities, i.e., the same white point as that of the hard copy illuminant such as D50. This is equivalent to applying the white point correction matrix $M_1^{-1}$ to the CRT XYZ data upon which the CRT profile is based.

The remaining chromatic correction can simply be performed by applying the chromatic correction matrix $M_2^{-1}$ to the CRT matrix constructed above using the uncorrected chromaticities for RGB and the corrected white point chromaticity values (e.g., D50). The advantage of this approach is that standard ICC generating tools can be employed to construct an uncorrected ICC profile for a CRT in which the desired white point (e.g., D50) has been assumed. The resulting profile can be corrected in a simple manner by applying the chromatic correction matrix $M_2^{-1}$ to the matrix portion of the matrix/TRC profile. This simple correction, combined with setting the white point of the CRT to a visually accurate D50 white point, will result in a good visual match between the CRT and hard copy.

EXAMPLE 3

The matrix $M_{HC \to CRT}$ is applied to the XYZ values for hard copy in order to derive the corresponding values in XYZ for the CRT.

$$\begin{pmatrix} X_{CRT} \\ Y_{CRT} \\ Z_{CRT} \end{pmatrix} = M_{HC \to CRT} \begin{pmatrix} X_{HC} \\ Y_{HC} \\ Z_{HC} \end{pmatrix}$$

Recall that the matrix for a CRT can be constructed from the combination of chromaticity and white point values for the CRT.

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_1})$$
$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

Assuming that the above values for this matrix are constant, then a new matrix can be defined based on the constants and corrections to the constants.

$$M(\Delta x_{r_1}, \Delta y_{r_1}, \Delta x_{g_1}, \Delta y_{g_1}, \Delta x_{b_1}, \Delta y_{b_1}, \Delta x_{wp}, \Delta y_{wp}) =$$
$$= M(x_{r_1} + \Delta x_{r_1}, y_{r_1} + \Delta y_{r_1}, x_{g_1} + \Delta x_{g_1}, y_{g_1} +$$
$$\Delta y_{g_1}, x_{b_1} + \Delta x_{b_1}, y_{b_1} + \Delta y_{b_1}, x_{wp} + \Delta x_{wp}, y_{wp} + \Delta y_{wp})$$

The $M_{HC \to CRT}$ matrix can then be created based on visual correction techniques.

$$M_{HC \to CRT} = M(\Delta x_{r_1}, \Delta y_{r_1}, \Delta x_{g_1}, \Delta y_{g_1}, \Delta x_{b_1}, \Delta y_{b_1}, \Delta x_{wp}, \Delta y_{wp}) M^{-1}(0,0,0,0,0,0,0,0)$$

This final expression defines a single matrix that is a function of visual corrections to white point and the chromaticities. This single matrix can be used to correlate XYZ values of hard copy to XYZ values for a CRT.

A number of implementations of the present invention have been described. For instance, color transformation techniques have been described for transforming device-independent coordinates to facilitate color matching. One or more implementations may be practiced with or without other color imaging techniques to realize soft proofing.

Nevertheless, it will be understood that various modifications may be made without departing from the spirit and scope of the invention. For instance, the transformation techniques may be implemented to improve color matching between any two imaging devices. For instance, the transformation techniques may be implemented to improve color matching between two printers or between two displays. Moreover, the concept of bifurcating a device-independent coordinate transformation can be applied more broadly than the white point verses chromatic implementation that is described in detail above.

A system implementing the transformation techniques can be one that converts a first set device-dependent coordinates to device-independent coordinates, performs the transformation, and the converts the transformed device-independent coordinates to a second set of device-dependent coordinates. Alternatively, the system can be one that converts a first set device-dependent coordinates to device-independent coordinates, performs the transformation calculations, and then converts a second set of device-dependent coordinates to the transformed device-independent coordinates.

These and other modifications can be made to the description above. Accordingly, other implementations and embodiments are within the scope of the following claims.

The invention claimed is:

1. A method for compensating for a visual mismatch between imagery presented by a display device relative to the same imagery presented by a hard copy, said method comprising the steps of:
    obtaining a white point correction for the display device;
    obtaining a chromatic correction for the display device
    generating in a device-independent color space adjusted device-independent color coordinates for the display device based on measured device-independent coordinates associated with the hard copy in the device-independent color space, the white point correction and the chromatic correction; and
    rendering images on the display device using the adjusted device-independent color coordinates, wherein the adjusted device-independent color coordinates for the display device compensate for a visual mismatch between imagery presented by the display device using the measured device-independent color coordinates relative to the same imagery presented by the hard copy using the measured device-independent color coordinates in the same illuminant conditions.

2. The compensating method of claim 1, further comprising:
    obtaining the white point correction by determining a white point correction matrix; and obtaining the chromatic correction by determining a chromatic correction matrix.

3. The compensating method of claim 2, wherein determining a white point correction matrix comprises:
displaying a color on a display device, the color being defined by an original white point matrix in a D50 illuminant condition; and
adjusting at least some white point matrix values so that visual appearance on the display device is visually equivalent to a print.

4. The compensating method of claim 3, wherein adjusting at least some white point matrix values comprises adjusting maximum phosphor settings on a display.

5. The compensating method of claim 2, wherein determining a chromatic correction matrix comprises:
displaying a color on a display device, the color being defined by an original chromatic matrix in a D50 illuminant condition; and
adjusting at least some chromatic matrix values so that visual appearance on the display device is visually equivalent to a print.

6. The compensating method of claim 5, wherein adjusting at least some chromatic matrix values comprises adjusting chromaticity values in an RGB color space.

7. The compensating method of claim 6, wherein adjusting chromaticity values in an RGB color space comprises adjusting chromaticity values in an AdobeRGB(D50) color space.

8. The compensating method of claim 1, wherein generating adjusted color coordinates based on the white point and chromatic corrections comprises generating a single correction matrix that includes both the white point and chromatic corrections.

9. A method for compensating for a visual mismatch between imagery presented by a display device relative to the same imagery presented by a hard copy, said method comprising the steps of:
determining device-independent coordinates in a device-independent color space defining a color on the hard copy;
generating adjusted device-independent coordinates in the device-independent color space for the display device using the determined device-independent coordinates in the device-independent color space, a white point correction and a chromatic; and
rendering images on the display device using the adjusted device-independent color coordinates, wherein the adjusted device-independent color coordinates for the display device compensate for a visual mismatch between imagery presented by the display device using the determined device-independent coordinates of the hard copy relative to the same imagery presented by the hard copy using the determined device-independent coordinates in the same illuminant conditions.

10. The compensating method of claim 9, further comprising displaying the color using the corrected coordinates.

11. The compensating method of claim 10, wherein the displayed color is visually equivalent to the color on the hard copy.

12. The compensating method of claim 9, wherein the white point correction is a white point correction matrix and the chromatic correction is a chromatic correction matrix.

13. The compensating method of claim 12, further comprising determining the white point correction matrix and the chromatic correction matrix.

14. The compensating method of claim 13, wherein determining the white point correction matrix comprises:
displaying a color on the display device, the color being defined by an original white point matrix in a D50 illuminant condition; and
adjusting at least some white point matrix values so that visual appearance on the display device is visually equivalent to a white printout viewed in the D50 illuminant condition.

15. The compensating method of claim 13, wherein determining the chromatic correction matrix comprises:
displaying a color on the display device, the color being defined by an original chromatic matrix in a D50 illuminant condition; and
adjusting at least some chromatic matrix values so that visual appearance on the display device is visually equivalent to a color printout viewed in the D50 illuminant condition.

16. A system comprising:
a display device;
a memory device; and
a processor coupled to the memory device and the display, wherein the processor:
obtains a white point correction for the display device from the memory device;
obtains a chromatic correction for the display device from the memory device; and
generates in a device-independent color space adjusted device-independent color coordinates for the display device based on measured device-independent coordinates associated with a hard copy in the device-independent color space, the white point correction and the chromatic corrections, wherein the adjusted device-independent color coordinates for the display device compensate for a visual mismatch between imagery presented by the display device using the measured device-independent color coordinates relative to the same imagery presented by the hard copy using the measured device-independent color coordinates in the same illuminant conditions.

17. A computer readable medium encoded with program code that when executed:
receives a white point correction for a display device as input;
receives a chromatic correction for the display device as input; and
generates in a device-independent color space adjusted device-independent color coordinates for the display device based on measured device-independent coordinates associated with a hard copy in the device-independent color space, the white point correction and the chromatic corrections, wherein the adjusted device-independent color coordinates for the display device compensate for a visual mismatch between imagery presented by the display device using the measured device-independent color coordinates relative to the same imagery presented by the hard copy using the measured device-independent color coordinates in the same illuminant conditions.

18. A computer readable medium encoded with a color profile data structure thereon, the color profile data structure corresponding to a display device and including adjusted device-independent illuminant condition values that do not correspond to actual device-independent illuminant conditions associated with the display device, such that colors rendered on the display device using the color profile data structure are visually equivalent to colors rendered on a printing device, wherein the adjusted device-independent illuminant condition values correct for a visual mismatch between a hard copy and imagery presented by the display device using measured device-independent color coordinates of the hard copy in the same illuminant conditions.

19. A method for correcting output of a display device when images rendered by the display device have measured device-independent color coordinates that are the same as measured device-independent coordinates for the images rendered on a hard copy in the same illuminant conditions yet the images rendered by the display device look visually different than the images rendered on the hard copy, the method comprising:

obtaining a white point correction for a display device;
  obtaining a chromatic correction for the display device; and
  generating in a device-independent color space adjusted device-independent color coordinates for the display device based on non-adjusted device-independent coordinates associated with the hard copy, the white point correction and the chromatic corrections, wherein the adjusted device-independent color coordinates adjust for the fact that images rendered by the display device having measured device-independent color coordinates that are the same as measured device-independent coordinates for images rendered on the hard copy in the same illuminant conditions look visually different than images rendered on the hard copy, and wherein images rendered by the display device using the adjusted device-independent color coordinates are substantially visually equivalent to images rendered on the hard copy using the non-adjusted device-independent coordinates.

* * * * *

UNITED STATES PATENT AND TRADEMARK OFFICE
CERTIFICATE OF CORRECTION

PATENT NO.         : 7,209,147 B2  
APPLICATION NO.    : 09/808875  
DATED              : April 24, 2007  
INVENTOR(S)        : Christopher J. Edge Page 1 of 1

It is certified that error appears in the above-identified patent and that said Letters Patent is hereby corrected as shown below:

| | |
|---|---|
| Claim 9, Column 17, Line 48 | In Claim 9, delete "chromatic;" and insert -- chromatic correction; --, therefor. |
| Claim 17, Column 18, Line 39 | In Claim 17, after "with" insert -- a --. |

Signed and Sealed this

Seventh Day of August, 2007

JON W. DUDAS  
*Director of the United States Patent and Trademark Office*